United States Patent
Kwak

(10) Patent No.: US 10,899,052 B2
(45) Date of Patent: Jan. 26, 2021

(54) SYSTEM FOR MOLDING DOOR PART OF AUTOMOBILE AIR CONDITIONER

(71) Applicant: Junghun Kwak, Cheonan-si (KR)

(72) Inventor: Junghun Kwak, Cheonan-si (KR)

( * ) Notice: Subject to any disclaimer, the term of this patent is extended or adjusted under 35 U.S.C. 154(b) by 309 days.

(21) Appl. No.: 15/912,933

(22) Filed: Mar. 6, 2018

(65) Prior Publication Data

US 2018/0257278 A1 Sep. 13, 2018

(30) Foreign Application Priority Data

Mar. 8, 2017 (KR) ......................... 10-2017-0029391

(51) Int. Cl.
*B29C 45/16* (2006.01)
*B29L 31/30* (2006.01)

(52) U.S. Cl.
CPC ........ *B29C 45/162* (2013.01); *B29C 45/1676* (2013.01); *B29C 2045/1621* (2013.01); *B29L 2031/3005* (2013.01)

(58) Field of Classification Search
CPC .............. B29C 45/162; B29C 45/1676; B29C 2045/1621; B29L 2031/3005
See application file for complete search history.

(56) References Cited

U.S. PATENT DOCUMENTS

| 5,753,151 A * | 5/1998 | McBride | B29C 45/1615 264/1.9 |
| 6,464,483 B1 * | 10/2002 | Lichtinger | B29C 31/00 264/277 |
| 6,827,571 B2 * | 12/2004 | Herbst | B29C 45/162 264/254 |

FOREIGN PATENT DOCUMENTS

| KR | 20-1998-0055411 U | 10/1998 |
| KR | 10-1528579 B1 | 6/2015 |
| KR | 10-2015-0109036 A | 10/2015 |

* cited by examiner

*Primary Examiner* — Alison L Hindenlang
*Assistant Examiner* — Olukorede Esan
(74) *Attorney, Agent, or Firm* — Novick, Kim & Lee, PLLC; Jae Youn Kim

(57) ABSTRACT

A system for molding a door part of an automobile air conditioner is provided. The system is capable of automating a double injection-molding performed in two stages for a cover plate and a seal of the door part. The system includes a first molding unit for molding the cover plate, a second molding unit for integrally molding the seal onto a circumference of the cover plate, and a carrier unit arranged between the first and second molding units for moving the cover plate molded by the first molding unit to the second molding unit.

4 Claims, 12 Drawing Sheets

SYSTEM FOR MOLDING DOOR PART OF AUTOMOBILE AIR CONDITIONER

CROSS REFERENCE TO RELATED APPLICATION

The present application claims priority to Korean Patent Application No. 10-2017-0029391, filed Mar. 8, 2017, the entire contents of which is incorporated herein for all purposes by this reference.

BACKGROUND OF THE INVENTION

Field of the Invention

The present invention relates generally to a system for molding a door part of an automobile air conditioner and, more particularly, to a system for molding a door part of an automobile air conditioner, by which the door part of the automobile air conditioner can be automatically injection-molded.

Description of the Related Art

Generally, a heating, ventilation, and air conditioning (HVAC) system for automobiles is installed to allow a driver or a passenger to control cooling/heating temperature, and air flow rate and direction for cooling/heating, ventilation, dehumidification, or the like in the interior of a vehicle.

Particularly, the control of the air flow rate and direction is performed by regulating a door part of an automobile air conditioner to open or close vent sections at predefined positions of the interior of a vehicle.

The vent sections include a central vent outlet for distribution of the conditioned air to the central portion in the interior of a vehicle, a foot vent outlet for distribution of the conditioned air to the lower side in the interior of a vehicle, and a defrost vent outlet for distribution of the conditioned air to the front windshield for defrosting, according to installation positions.

FIG. 1 illustrates a conventional door part of an automobile air conditioner in a perspective view, and FIG. 2 is a view illustrating the installed state of the conventional door part.

As illustrated in FIGS. 1 and 2, the conventional door part 10 includes a cover plate 12 that is injection-molded to open and close the vent outlet, and a seal 14 that is circumferentially integrally injection-molded with the cover plate 12.

According to the above configuration, when closing the vent outlets, the door part 10 can completely prevent air leakage from between the cover plate 12 and the seal 14.

In the meantime, the door part 10 has a double injection-molded structure in which the cover plate 12 is primarily molded from a synthetic resin material, and then the seal 14 is secondarily injection-molded to the circumference of the molded cover plate 12.

That is, the double injection-molding process of the door part 10 is carried out by molding the cover plate 12 using a primary molding apparatus, transmitting the molded cover plate to a secondary process site by an operator, and molding the seal 14 to the circumference of the cover plate 12 using a secondary molding apparatus.

However, since the double injection-molding process of the conventional door part of the automobile air conditioner is carried out by an operator in a manual mode, there are structural problems in that a quality of a molded product can be affected by an operator's skill level, and productivity can also be reduced due to a manual production method.

The foregoing is intended merely to aid in the understanding of the background of the present invention, and is not intended to mean that the present invention falls within the purview of the related art that is already known to those skilled in the art.

DOCUMENTS OF RELATED ART (Patent Document 1) Korean Patent No. 10-1528579 (registered on Jun. 8, 2015);
(Patent Document 2) Korean Patent Application Publication No. 10-2015-0109036 (published on Oct. 1, 2015);
(Patent Document 3) Korean Utility Model Publication No. 20-1998-055411 (published on Oct. 7, 1998)

SUMMARY OF THE INVENTION

Accordingly, the present invention has been made keeping in mind the above problems occurring in the related art, and the present invention is intended to propose a system for molding a door part of an automobile air conditioner, in which system a double injection-molding process for a cover plate and a seal is automated, thereby contributing to a reduction in defects of a molded product through stable injection molding of a product, and to an improvement in productivity through reduced manufacturing time.

A technical problem of the present invention is not limited to the above-mentioned problems, and other technical problems will be apparent to an ordinary skilled person in the art to which the present invention pertains from the following description.

In order to achieve the above object, according to one aspect of the present invention, there is provided a system for molding a door part of an automobile air conditioner, wherein the system is capable of automating a double injection-molding performed in two stages for a cover plate and a seal of the door part, the system including: a first molding unit including: a first material supply section; a first molding section molding the cover plate with a source material supplied from the first material supply section; and a first carrier robot section suctioning and moving the cover plate molded by the first molding section to a post processing stage; a second molding unit spaced apart from the first molding unit and including: a second material supply section; a second molding section integrally molding the seal to a circumference of the cover plate with a source material supplied from the second material supply section; and a second carrier robot section suctioning and moving the cover plate, which was moved from the first molding unit, to the second molding section; and a carrier unit arranged between the first and second molding units so as to be moved to a position adjacent to the second molding unit such that the cover plate, which was suctioned and moved by the first carrier robot section to a predefined position, is able to be suctioned and moved by the second carrier robot section to the second molding section.

The first and second molding units may respectively further include first and second guide rails extending oppositely, wherein the first and second carrier robot sections are respectively moved along the first and second guide rails when moving the cover plate.

The first carrier robot section may include: a first body part moving along a first guide rail; a first lifting part vertically movably coupled to the first body part; and a first arm part coupled to an end side of the first lifting part in a rotatable manner in all directions so as to suction and move the cover plate molded by the first molding section to a predefined position of the carrier unit.

The second carrier robot section may include: a second body part moving along a second guide rail; a second lifting part vertically movably coupled to the second body part; and a second arm part coupled to an end side of the second lifting part in a rotatable manner in all directions so as to suction and move the cover plate, which was moved to a position adjacent to the second molding unit by the carrier unit, to the second molding section.

The carrier unit may include: a casing disposed between the first molding unit and the second molding unit and having first and second inlets on opposite sides of an upper portion thereof, wherein the first and second carrier robot sections access the carrier unit through the inlets; a first seating jig disposed in the casing below the first inlet so as to seat the cover plate moved by the first carrier robot section; a second seating jig disposed below the second inlet correspondingly to the first seating jug so as to seat the cover plate which is not yet moved to the second molding section; and a carrier section coupled between the first seating jig and the second seating jig so as to be moved along a carrier guide rail so as to suction and move the cover plate seated on the first seating jig to the second seating jig so that the cover plate is able to be seated on the second seating jig.

According to the present invention, there is an advantageous effect that the double injection-molding process for the cover plate and the seal is automated, thereby contributing to a reduction in defects of a molded product through stable injection molding of a product, and to an improvement in productivity through reduced manufacturing time.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Hereinbelow, preferred embodiments of the present invention will be described in detail with reference to the accompanying drawings. In the following description, however, it is to be noted that the description of functions or configurations of conventional elements will be omitted to prevent making the gist of the present invention unclear.

Figure 1:
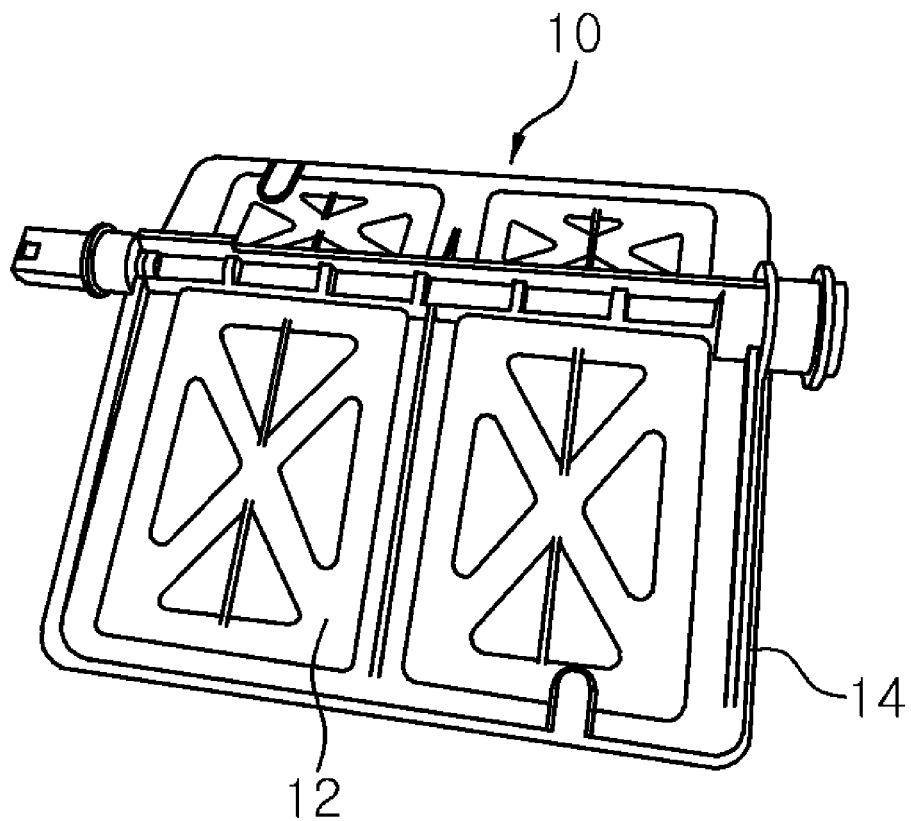
FIG. 1 is a view illustrating a conventional door part for an automobile air conditioner.
Figure 2:
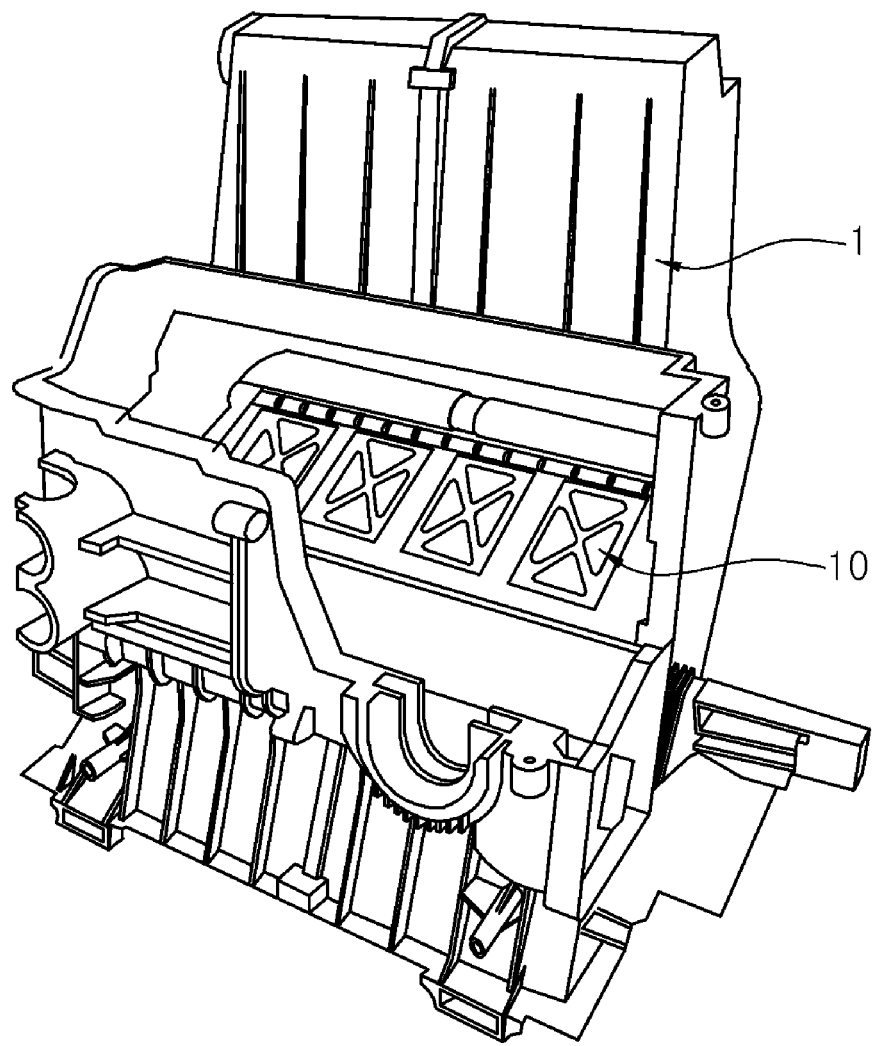
FIG. 2 is a view illustrating the installed state of the door part of FIG. 1.
Figure 3:
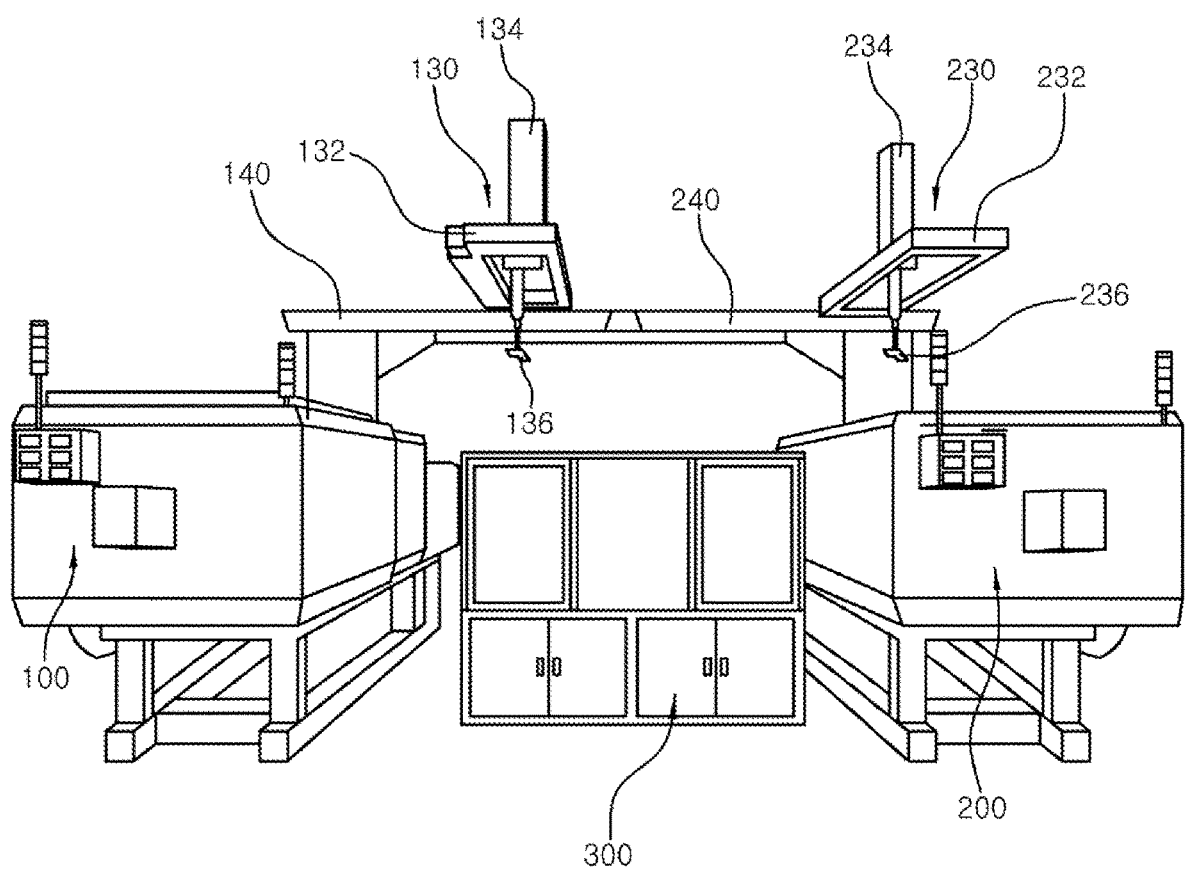
FIG. 3 is a view illustrating a system for molding a door part of an automobile air conditioner according to embodiments of the present invention.
Figure 4:
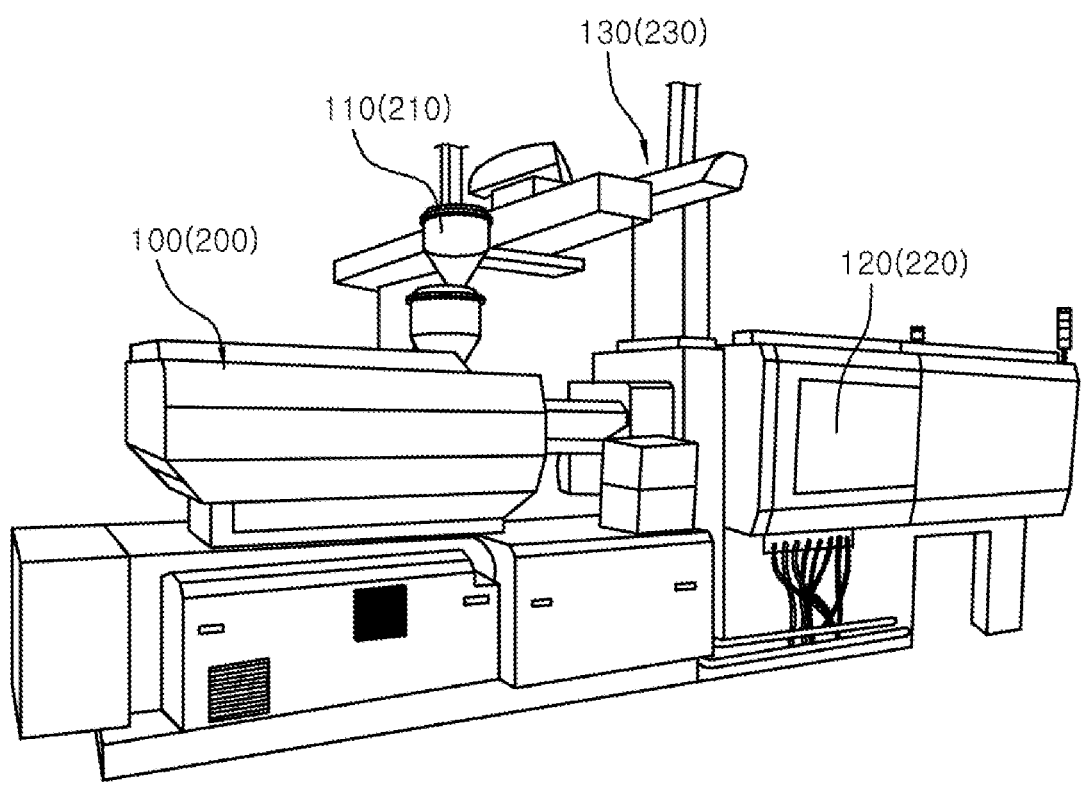
FIG. 4 is a view illustrating a first molding unit of the molding system according to embodiments of the present invention.
Figure 5:
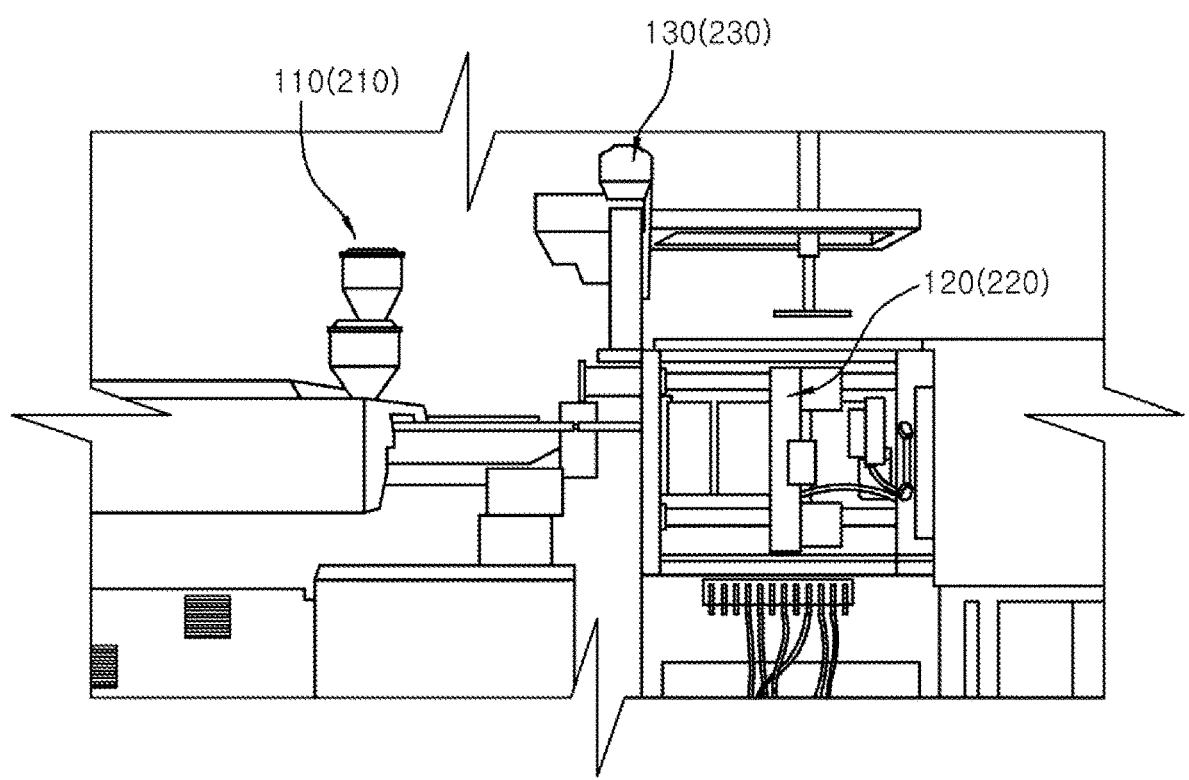
FIG. 5 is a view illustrating a main part of the first molding unit of FIG. 4.
Figure 6:
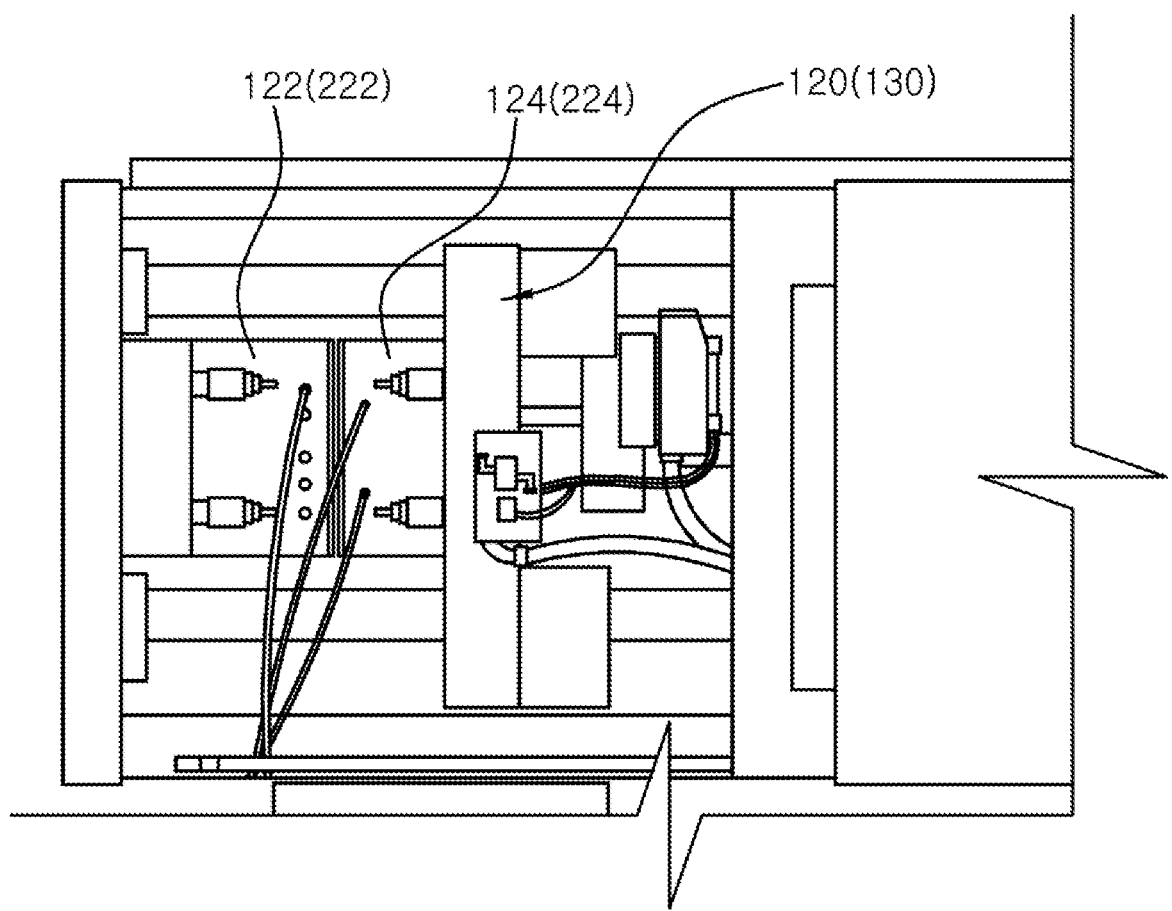
FIG. 6 is a view illustrating a main part of a first molding section illustrated in FIG. 5.
Figure 7:
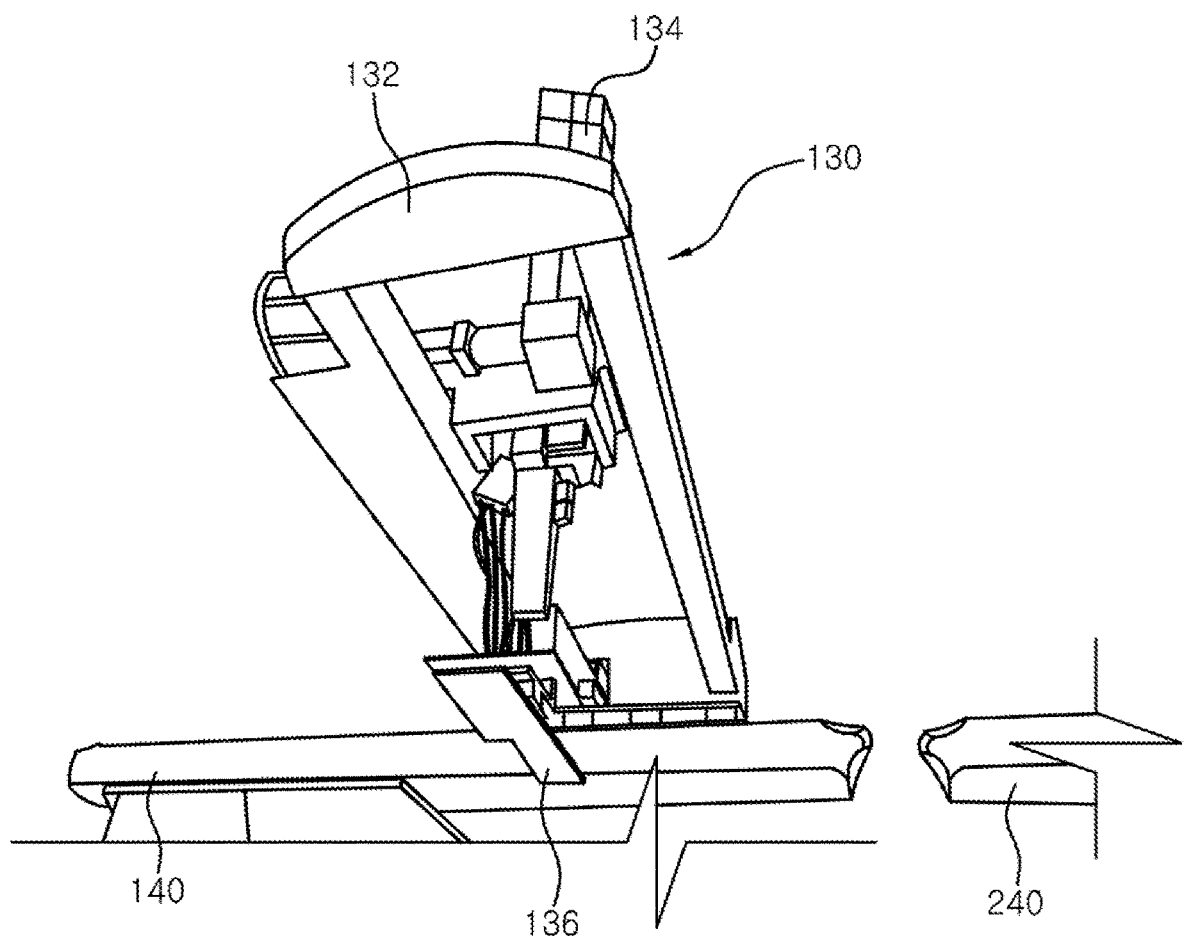
FIG. 7 is a view illustrating a main part of a first carrier robot section illustrated in FIG. 4.
Figure 8:
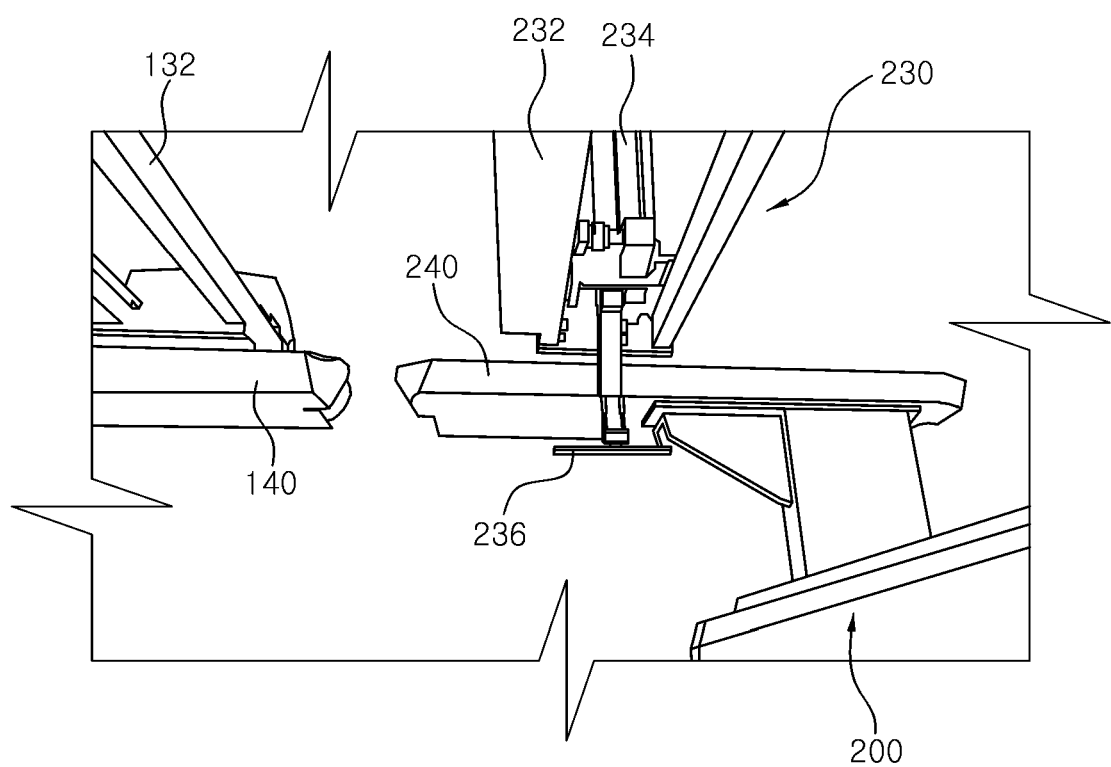
FIG. 8 is a view illustrating a main part of a second carrier robot section illustrated in FIG. 3.
Figure 9:
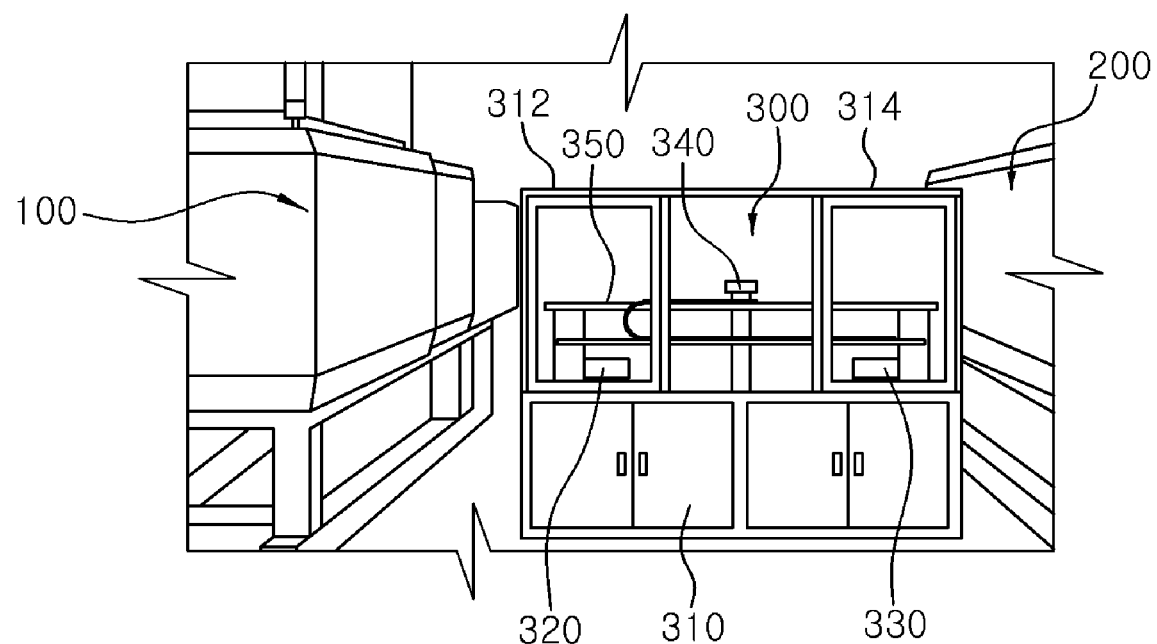
FIG. 9 is a view illustrating a carrier unit of the molding system according to embodiments of the present invention.
Figure 10:
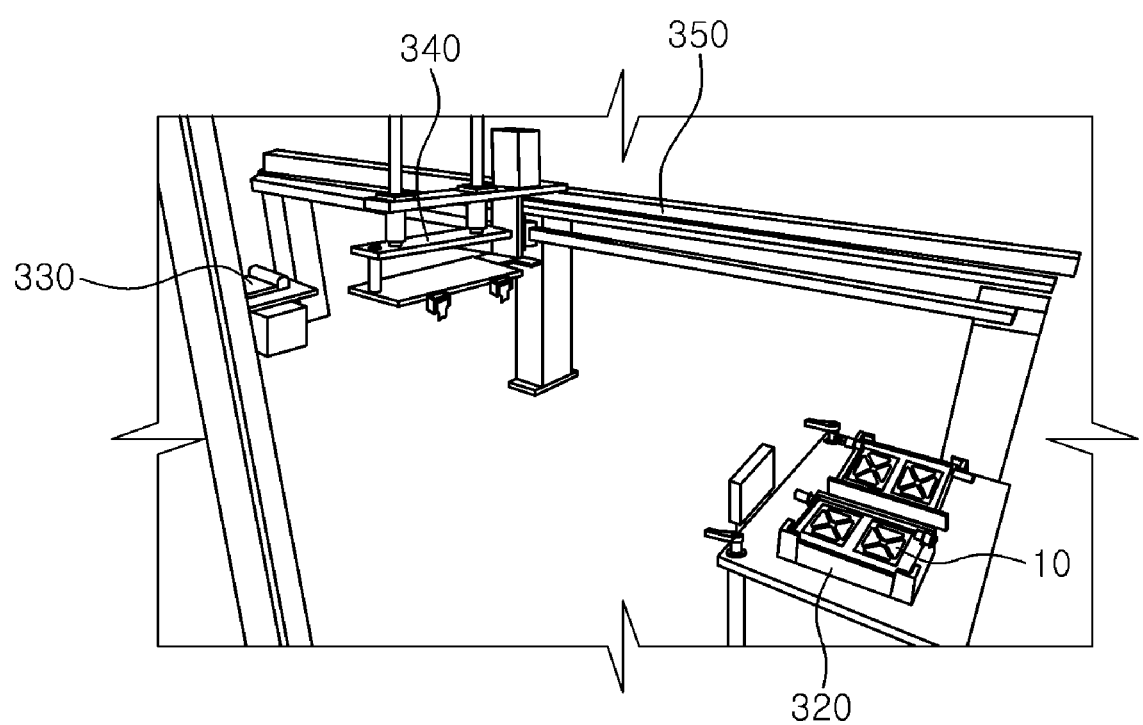
FIGS. 10 and 11 are views illustrating the interior of the carrier unit of FIG. 9.
Figure 11:
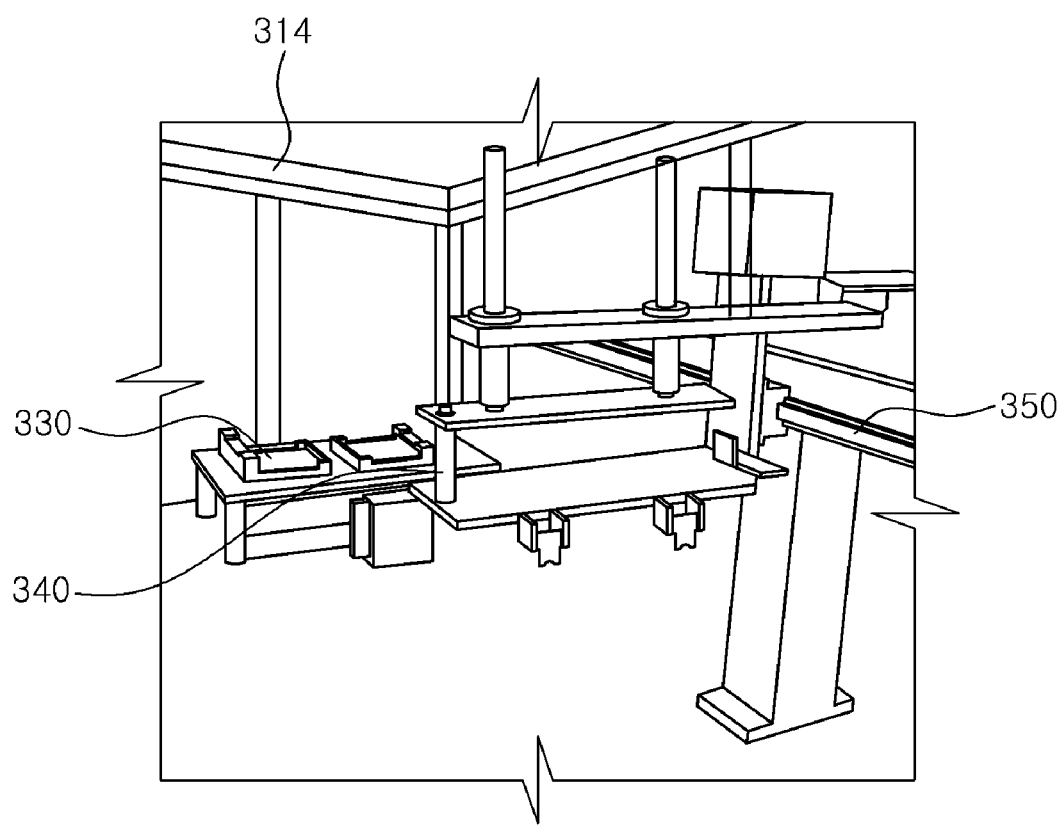
Figure 12:
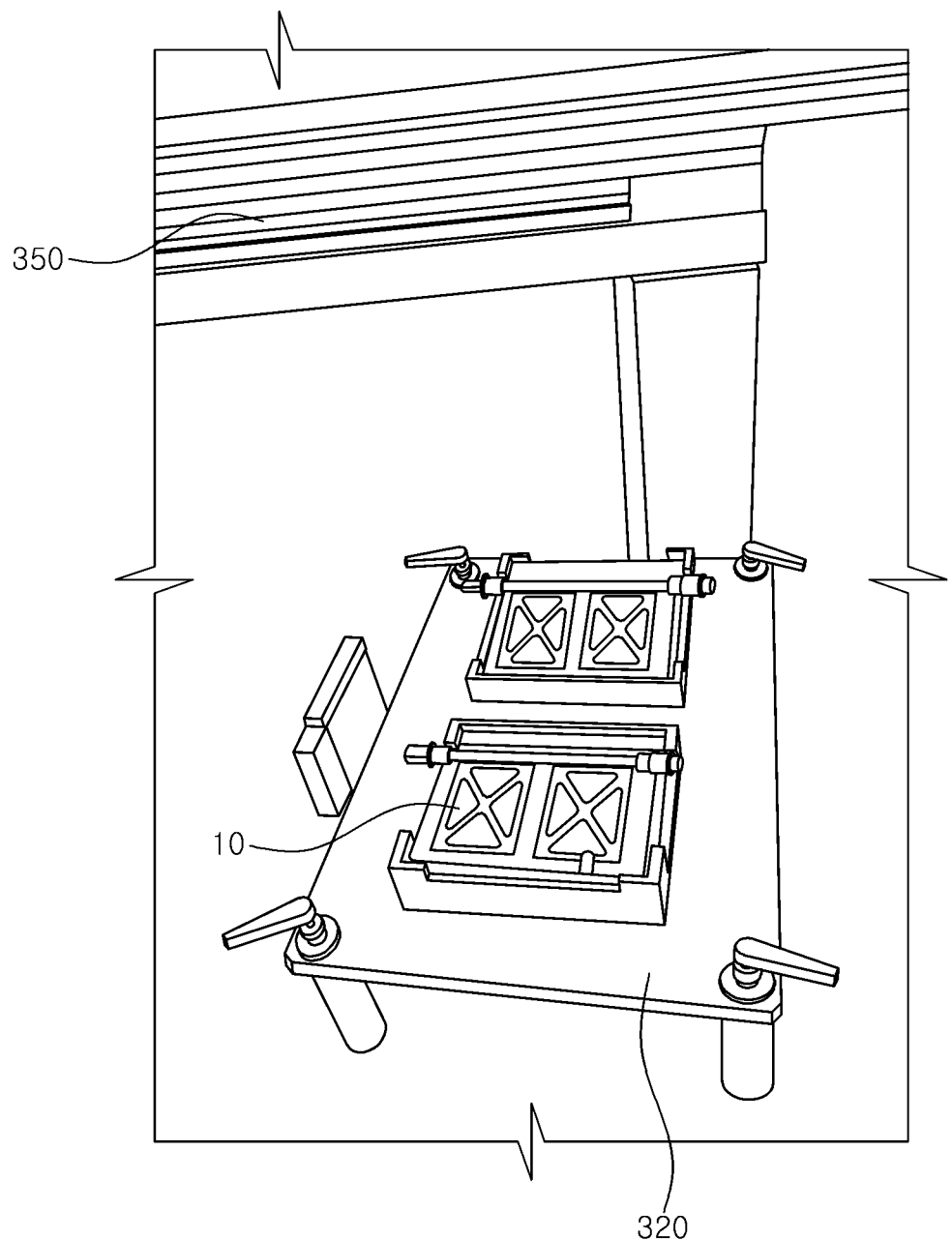
FIG. 12 is a view illustrating a first seating jig of the carrier unit of FIG. 10.

FIG. 3 is a view illustrating a system for molding a door part of an automobile air conditioner according to embodiments of the present invention. FIG. 4 is a view illustrating a first molding unit of the molding system according to embodiments of the present invention. FIG. 5 is a view illustrating a main part of the first molding unit of FIG. 4. FIG. 6 is a view illustrating a main part of a first molding section illustrated in FIG. 5. FIG. 7 is a view illustrating a main part of a first carrier robot section illustrated in FIG. 4. FIG. 8 is a view illustrating a main part of a second carrier robot section illustrated in FIG. 3. FIG. 9 is a view illustrating a carrier unit of the molding system according to embodiments of the present invention. FIGS. 10 and 11 are views illustrating the interior of the carrier unit of FIG. 9. FIG. 12 is a view illustrating a first seating jig of the carrier unit of FIG. 10.

As illustrated in FIG. 3, the molding system for the door part of an automobile air conditioner includes a first molding unit 100 for molding a cover plate 12 of the door part 10, a second molding unit 200 for integrally molding a seal 14 onto a circumference of the cover plate 12, and a carrier unit 300 arranged between the first and second molding units 100 and 200 for moving the cover plate 12 molded by the first molding unit 100 to the second molding unit 200.

As illustrated in FIGS. 3 to 5, the first molding unit 100 is provided to injection-mold the cover plate 12 of the door part 10, and includes a first material supply section 110 for supplying a source material, a first molding section 120 for molding the cover plate 12 with the source material supplied from the first material supply section 110, and a first carrier robot section 130 for suctioning and moving the cover plate 12 molded by the first molding section 120 to a post processing stage.

The first material supply section 110 is coupled to one side of the first molding unit 100 so as to supply, to the first molding section 120, an amount of source material for injection-molding of the cover plate 12. The first material supply section 110 has a structure which is connected to an external storage tank such that a source material can be continuously supplied to the first molding section 120.

The first molding section 120 is coupled to the other side of the first molding unit 100 correspondingly to the first material supply section 110. The first molding section 120 serves to injection-mold the cover plate 12 with the source material supplied from the first material supply section 110.

To this end, as illustrated in FIG. 6, the first molding section 120 consists of a stationary die 122 and a movable die 124, which are engaged with each other to define a mold cavity therebetween, to which the source material is supplied so as to injection-mold the cover plate 12.

The first carrier robot section 130 is coupled to the first molding unit 100 such that it is disposed between the first material supply section 110 and the first molding section 120. The first carrier robot section includes a first body part 132 moving along a first guide rail 140, a first lifting part 134 vertically movably coupled to the first body part 132, and a first arm part 136 rotatably coupled to an end side of the first lifting part 134 so as to suction and move the cover plate 12 molded by the first molding section 120 to a predefined position of the carrier unit 300.

The first body part 132 is coupled to the first molding unit 100 such that the body part can move along the first guide rail 140 horizontally extending towards the carrier unit 300.

The first body part 132 can thus move freely towards the carrier unit 300 along the first guide rail 140.

The first lifting part 134 is coupled to the body part 132 in a vertically movable manner. The first lifting part 134 may be composed of a pneumatic or hydraulic cylinder. Further, the first lifting part 134 may employ all of conventional configurations so long as it has a structure capable of moving in a vertical direction in a state of being coupled to the first body part 132.

The first arm part 136 is rotatably coupled to the end side of the first lifting part 134, as illustrated in FIG. 7. Here, the first arm part 136 has a structure that is coupled to the end side of the first lifting part 134 in a rotatable manner in all directions in order to easily suction and move the cover plate 12 molded by the first molding section 120. The first arm part 136 serves to suction, move, and seat the cover plate 12 onto a first seating jig 320 of the carrier unit 300 when the cover plate 12 has been molded by the first molding section 120.

As illustrated in FIG. 3, the second molding unit 200 is spaced apart from and opposite to the first molding unit, and includes a second material supply section 210 for supplying a source material, a second molding section 220 for integrally molding the seal 14 to the circumference of the cover plate 12 with a source material supplied from the second material supply section 210, and a second carrier robot section 230 for suctioning and moving the cover plate 12, which was moved from the first molding unit 100, to the second molding section 220.

Here, the second molding unit 200 has the same structure as that of the first molding unit 100. However, since the second molding unit 200 integrally molds the seal 14 to the circumference of the cover plate 12 molded by the first molding unit 100, the structure of the second molding section 220 is different from that of the first molding section 120 of the first molding unit 100.

Similar to the first material supply section 110, the second material supply section 210 is coupled to one side of the second molding unit 200 so as to supply, to the second molding section 220, an amount of source material for integral injection-molding of the seal 14 to the circumference of the cover plate 12. The second material supply section 210 has a structure which is connected to an external storage tank such that a source material can be continuously supplied to the second molding section 220.

Similar to the first molding section 120, the second molding section 220 is coupled to the other side of the second molding unit 200 correspondingly to the second material supply section 210. The second molding section 220 serves to secondarily injection-mold the seal 14 to the circumference of the cover plate 12 with the source material supplied from the second material supply section 210.

To this end, similar to the first molding section 120, the second molding section 220 consists of a stationary die 222 and a movable die 224, which are engaged with each other to define a mold cavity therebetween, to which the source material is supplied from the second material supply section 210 so as to secondarily integrally injection-mold the seal 14 to the circumference of the cover plate 12.

The second carrier robot section 230 is coupled to the second molding unit 200 between the second material supply section 210 and the second molding section 220. The second carrier robot section includes a second body part 232 moving along a second guide rail 240, a second lifting part 234 vertically movably coupled to the second body part 232, and a second arm part 236 rotatably coupled to an end side of the second lifting part 234 so as to suction and move the cover plate 12, which was moved to a position adjacent to the second molding unit 200 by the carrier unit 300, to the second molding section 220.

The second body part 232 is coupled to the second molding unit 200 such that the body part can move along the second guide rail 240 horizontally extending towards the carrier unit. The second body part 232 can thus move freely towards the carrier unit 300 along the second guide rail 240. Here, the second guide rail 240 has a structure extending from the second molding unit 200 correspondingly to the first guide rail 140 of the first molding unit 100.

The second lifting part 234 is coupled to the second body part 232 in a vertically movable manner. The second lifting part 234 may be composed of a pneumatic or hydraulic cylinder. Further, the second lifting part 234 may employ all of conventional configurations so long as it has a structure capable of moving in a vertical direction in a state of being coupled to the second body part 232.

The second arm part 236 is coupled to the end side of the second lifting part 234 in a rotatable manner in all directions, as illustrated in FIG. 8. Here, the second arm part 236 has a structure that is coupled to the end side of the second lifting part 234 in a rotatable manner in all directions in order to easily suction and move the cover plate 12, which was seated on the second seating jig 330 of the carrier unit 300, to the second molding section 220. The second arm part 236 serves to suction and move the cover plate 12, which was moved to a position adjacent to the second molding unit 200 by the carrier unit 300, to the second molding section 220.

As illustrated in FIGS. 9 to 12, the carrier unit 300 is arranged between the first molding unit 100 and the second molding unit 200, and includes a casing 310 disposed between the first molding unit 100 and the second molding unit 200, a first seating jig 320 disposed in the casing 310 to seat the cover plate 12 moved by the first carrier robot section 130, a second seating jig 330 disposed in the casing 310 correspondingly to the first seating jug 320 to seat the cover plate 12 which is not yet moved to the second molding section 220, and a carrier section 340 coupled between the first seating jig 320 and the second seating jig 330 to move along a carrier guide rail 350 so as to suction and move the cover plate 12 seated on the first seating jig 320 onto the second seating jig 330.

The casing 310 is provided to accommodate the first seating jig 320, the second seating jig 330, and the carrier section 340, and has first and second inlets 312 and 314 on opposite sides on an upper portion thereof. That is, the first and second inlets 312, 314 are inlets through which the first and second robot sections 130, 230 can access the casing 310 for suction and movement of the cover plate 12.

The first seating jig 320 is provided in the casing 310 below the first inlet 312. The first seating jig 320 seats the cover plate 12 which is molded by the first molding section 120 and suctioned and moved thereto by the first robot section 130.

The second seating jig 330 is disposed in the casing 310 below the second inlet 314 correspondingly to the first seating jig 320. The second seating jig 330 seats the cover plate 12 suctioned and moved thereto by the carrier unit 340. That is, the second seating jig 330 seats the cover plate 12 which is moved from the first seating jig 320, but is not yet moved to the second molding section 220 of the second molding unit 200.

The carrier section 340 is coupled to the interior of the casing 310 so as to be moved along the carrier guide rail between the first seating jig 320 and the second seating jig 330. The carrier section 340 serves to suction and move the cover plate 12, which is seated on the first seating jig 320, to the second seating jig 330. That is, the carrier section 340 is connected to an external suctioning device by which the cover plate 12 is moved from the first seating jig 320 to the second seating jig 330 in a suctioned state.

In the meantime, although not illustrated and described in this embodiment, the first molding unit 100, the second molding unit 200, and the carrier unit 300 are configured to be automatically controlled by a controller. That is, the controller may be configured to control the first molding unit 100, the second molding unit 200, and the carrier unit 300 for throughput or time unit during molding of a product.

The molding process of the door part of an automobile air conditioner will now be described.

First, after the stationary die 122 and the movable die 124 of the first molding section 120 are engaged with each other, the source material from the first material supply section 110 is supplied, thereby performing the primary injection molding of the cover plate 12.

When the cover plate 12 is injection-molded, the stationary die 122 and the movable die 124 of the first molding section 120 are separated from each other, and the molded cover plate 12 is suctioned and moved by the first carrier robot section 130 to the first seating jig 320 via the first inlet 312 at the casing 310 of the carrier unit 300, so that the cover plate is seated on the first seating jig 320.

When the cover plate 12 is seated on the first seating jig 320, the carrier section 340 suctions and moves the cover plate 12 from the first seating jig 320 to the second seating jig 330 along the carrier guide rail 350, so that the cover plate 12 is seated on the second seating jig 330.

When the cover plate 12 is seated on the second on the second seating jig 330, the second carrier robot section 230 of the second molding unit 200 sucks and moves the cover plate 12 from the second seating jig to the second molding section 220 via the second inlet 314 at the casing 310.

When the cover plate 12 is moved to the second molding section 230, the stationary die 222 and the movable die 224 are engaged with each other, and the source material from the second material supply section 210 is supplied to the second molding section 220 so that the seal 14 is integrally injection-molded to the circumference of the cover plate 12.

According to the automated process, the cover plate 12 is primarily molded by the first molding unit 100, the molded cover plate 12 is moved to a position adjacent to the second molding unit 200 by the carrier unit 300, and then the seal 14 is secondarily injection-molded to the circumference of the cover plate 12 by the second molding unit 200.

As set forth in the foregoing description, the molding system for the door part of an automobile air conditioner has an effect that the double injection-molding process for the cover plate 12 and the seal 14 of the door part 10 is automated, thereby contributing to a reduction in defects of a molded product through stable injection molding of a product, and to an improvement in productivity through reduced manufacturing time.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A system for molding a door part of an automobile air conditioner, wherein the system is capable of automating a double injection-molding performed in two stages for a cover plate and a seal of the door part, the system comprising:
    a first molding unit including: a first material supply section; a first molding section molding the cover plate with a source material supplied from the first material supply section;
    and a first carrier robot section suctioning and moving the cover plate molded by the first molding section to a post processing stage;
    a second molding unit spaced apart from the first molding unit and including: a second material supply section; a second molding section integrally molding the seal to a circumference of the cover plate with a source material supplied from the second material supply section; and a second carrier robot section suctioning and moving the cover plate, which was moved from the first molding unit, to the second molding section; and
    a carrier unit arranged between the first and second molding units so as to be moved to a position adjacent to the second molding unit such that the cover plate, which was suctioned and moved by the first carrier robot section to a predefined position on the carrier unit, is able to be suctioned and moved by the second carrier robot section to the second molding section,
    wherein the carrier unit includes:
    a casing disposed between the first molding unit and the second molding unit and having first and second inlets on opposite sides of an upper portion thereof, wherein the first and second carrier robot sections access the carrier unit through the inlets;
    a first seating jig disposed in the casing below the first inlet so as to seat the cover plate moved by the first carrier robot section;
    a second seating jig disposed below the second inlet correspondingly to the first seating jig so as to seat the cover plate which is not yet moved to the second molding section; and
    a carrier section coupled between the first seating jig and the second seating jig so as to be moved along a carrier guide rail so as to suction and move the cover plate seated on the first seating jig to the second seating jig so that the cover plate is able to be seated on the second seating jig.

2. The system according to claim 1, wherein the first and second molding units further respectively include first and second guide rails extending oppositely, wherein the first and second carrier robot sections are respectively moved along the first and second guide rails when moving the cover plate.

3. The system according to claim 1, wherein the first carrier robot section includes:
    a first body part moving along a first guide rail;
    a first lifting part vertically movably coupled to the first body part; and
    a first arm part coupled to an end side of the first lifting part in a rotatable manner in all directions so as to suction and move the cover plate molded by the first molding section to the predefined position of the carrier unit.

4. The system according to claim 1, wherein the second carrier robot section includes:
    a second body part moving along a second guide rail;
    a second lifting part vertically movably coupled to the second body part; and
    a second arm part coupled to an end side of the second lifting part in a rotatable manner in all directions so as to suction and move the cover plate, which was moved to the position adjacent to the second molding unit by the carrier unit, to the second molding section.

* * * * *